US007685566B2

(12) United States Patent
Brown, Jr. et al.

(10) Patent No.: US 7,685,566 B2
(45) Date of Patent: Mar. 23, 2010

(54) STRUCTURED MESSAGE PROCESS CALCULUS

(75) Inventors: Allen L. Brown, Jr., Bellevue, WA (US); Lucius Gregory Meredith, Seattle, WA (US); Cosimo Laneve, Bologna (IT)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 10/881,142

(22) Filed: Jun. 30, 2004
(Under 37 CFR 1.47)

(65) Prior Publication Data
US 2005/0166183 A1    Jul. 28, 2005

Related U.S. Application Data

(60) Provisional application No. 60/484,795, filed on Jul. 3, 2003.

(51) Int. Cl.
*G06F 9/44*    (2006.01)
*G06F 9/45*    (2006.01)

(52) U.S. Cl. .............. 717/114; 717/116; 717/118; 717/143

(58) Field of Classification Search ............... 717/114
See application file for complete search history.

(56) References Cited

U.S. PATENT DOCUMENTS 6,754,884 B1 * 6/2004 Lucas et al. ................ 717/108

2005/0114771 A1 * 5/2005 Piehler et al. .............. 715/536

OTHER PUBLICATIONS

"Category: Concurrent programming language", Wikipedia, Apr. 2009, pp. 1-2.*
"Bigtop (computer science)", Wikipedia, Apr. 2009, pp. 1-2.*
"A behavioral module system for the pi-calculus", Rajamani et al., Jan. 2001, pp. 375-394. Online retrieved at <http://www.springerlink.com/content/n4t15f47lxtf3hdk/fulltext.pdf>.*
"A small calculus for concurrent objects", Honda et al., Apr. 1991, pp. 50-54. Online retrieved at <http://delivery.acm.org/10.1145/130000/127079/p50-honda.pdf>.*
"Heap architectures for concurrent languages using message passing", Johansson et al., Feb. 2003, pp. 88-99. Online retrieved at <http://delivery.acm.org/10.1145/520000/512440/p88-sagonas.pdf>.*
"Slicing concurrent java programs", Chen et al., Apr. 2001, pp. 41-47. Online retrieved at <http://delivery.acm.org/10.1145/380000/375420/p41-chen.pdf>.*
Abiteboul, et al., "Active XML: Peer to peer data and Web services integration", *VLDP: Proceedings of the 28th International Conference on Very Large Data Bases*, 2002, 1087-1090.

(Continued)

*Primary Examiner*—Tuan Q Dam
*Assistant Examiner*—Thuy Dao
(74) *Attorney, Agent, or Firm*—Woodcock Washburn LLP

(57) ABSTRACT

Trees are a common semantic denominator of XML data types and process calculi. This indicates a potential tight intertwining of the syntax and semantics of data and processes. The invention provides this intertwining via a process calculus wherein the data language syntax is a fragment of the programming language syntax.

21 Claims, 7 Drawing Sheets

```
P ::=            process
    0            (nil)
    x(T).P       (input)
    P | P        (parallel)
    P + P        (choice)
    x[V]         (output)
    (x)P         (new)
    X            (process variable)
    rec X.P      (recursion)
```

OTHER PUBLICATIONS

Brown, A. et al., "π Duce: A Process Calculus with Native XML Datatypes", 10 pages.

Brown, A.L. Jr. et al., "The Highwire Abstract Syntax", Highwire Design Specification, Mar. 29, 2004, Microsoft Corporation.

Christensen, et al., *Static Analysis for Dynamic XML, Technical Report RS-02-24*, BRICS, 2002.

Gardner, P. et al., *Linear Forwarders*, 14th International Conference on Concurrency Theory (CONCUR), 2003, vol. 2761 of *Lecture Notes in Computer Science*, 2002, 415-430.

Hosoya, et al., "XDuce: A Statically Typed XML Processing Language", *ACM Transactions on Internet Technology*, 2003, 3(2), 117-148.

Sangiori, "Bisimulation with Higher-Order Process Calculi", *Information and Computation*, 1996, 131, 141-178.

Pi Calculus Project, "pi Calculus in Depth", Jun. 9, 2004, http://www.doc.ic.ac.uk/~sa701/pi/depth.htm, 6 pages.

"X Calculus, A Computation Mechanism for Data", Jul. 3, 2003, 12 pages.

\* cited by examiner $V ::=$   value
  $\ell$   (simple value)
  $x$   (channel value)
  $u$   (data variable)
  $0$   (empty value)
  $a[V].V$   (tagged value)

FIGURE 3A

$T ::=$   pattern
  $u$   (data variable)
  $0$   (empty pattern)
  $a[T].T$   (tagged pattern)
  $T | T$   (parallel pattern)

FIGURE 3B

$P ::=$   process
  $0$   (nil)
  $x(T).P$   (input)
  $P | P$   (parallel)
  $P + P$   (choice)
  $x[V]$   (output)
  $(x)P$   (new)
  $X$   (process variable)
  $rec\ X.P$   (recursion)

FIGURE 3C

1. *the scope laws*

$(x)0 \equiv 0,$   $(x)(y)P \equiv (y)(x)P,$   $if\ x \notin fc(P): P | (x)Q \equiv (x)(P|Q)$ 2. *the recursion law*

$rec\ X.P \equiv P\{rec\ X.P/X\}$

3. *the pattern congruence law*

$if\ T \equiv T'\ and\ P \equiv P': \quad x(T).P \equiv x(T').P$

FIGURE 5

STRUCTURED MESSAGE PROCESS CALCULUS

CROSS-REFERENCE TO RELATED APPLICATIONS

This application claims benefit under 35 U.S.C. §119(e) of provisional U.S. patent application No. 60/484,795, filed Jul. 3, 2003.

FIELD OF THE INVENTION

Generally, the invention relates to computing systems. More particularly, the invention relates to a process calculus for sending and receiving structured messages.

BACKGROUND OF THE INVENTION

A process calculus may be described as a formal language used to specify the actions of processes and their sequential and concurrent composition. A process calculus may be defined by a syntax and semantics, and may form the basis for a computer programming language.

A data language, such as the well-known Extensible Markup Language ("XML"), for example, may also be defined by a syntax and semantics. XML is a simple, flexible format for structured data that has been standardized by the World Wide Web Consortium. This format is now widely used to communicate documents over the web.

There are two themes of current XML research to which the invention pertains: XML type checking, and concurrent languages for XML processing. A well-known contribution to the first theme is XDuce, a core functional programming language with XML documents as basic values. In XDuce, however, schema validation is performed at compile-time. A similar approach is CDuce, where some limitations of XDuce, mostly about type and run-time systems, have been eliminated. Related contributions include languages for performing queries over XML documents.

The second theme, concurrent programming languages for XML processing, is perhaps less well-known. Though programming has been part of the efforts cited under the first theme, the concurrency of that programming has not been a central topic of investigation. All define new XML-targeted programming languages, which retain ad-hoc features that make them suited for XML document application: transformation, extraction of information, creation of documents, etc. There is an important facet of XML, however, that the above researches overlook, namely, that XML is also becoming the lingua franca for communications.

Indeed, XML is extremely important for the design of emerging technologies, e.g., web applications such as business process management systems and web services, where data, in the form of XML documents, are processed and exchanged by the components of the application. In the setting of these essentially distributed applications, the above-cited languages, being sequential, do not match the applications' natural control structures.

The foundations of web applications technologies, such as MICROSOFT BIZTALK and BPEL4WS, have already been recognized in process calculi. As a consequence, concurrent extensions of the above-mentioned proposals have been already investigated. Some dialects of XDuce, for example, have been extended with concurrent primitives drawn from π-calculus and from ambient calculus. These dialects, however, neither provide a small concurrent calculus with a simple and powerful semantics, nor provide an intermediate language for high level programming languages.

From the foregoing, it is appreciated that there exists a need for systems and methods that overcome the prior art.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The invention provides an extension of π-calculus wherein the data language syntax is a fragment of the programming language syntax. A foundational intent of the invention is to provide a small concurrent calculus with a simple and powerful semantics. A practical intent of the invention is that the calculus may be used as an intermediate language for high level programming languages.

A computer according to the invention, which may include a virtual machine, for example, may include a data store having stored therein computer-executable instructions based on a process calculus having a data language syntax that is a fragment of the programming language syntax. Thus, according to the invention, the data language syntax and semantics may be intertwined with the programming language syntax and semantics.

The programming language may include syntactical elements that represent values, patterns, and processes, for example. The process syntactical elements may include an inactive process, an input process, a parallel process, a choice of processes, an output process, and a new process. The pattern syntactical elements may include an empty pattern, a tagged pattern, a parallel pattern, and a data variable. The value syntactical elements may include an empty value, a simple value, a channel value, a data variable, and a tagged value.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed.

FIGS. 3A-C depict syntactical elements for an example embodiment of a programming language according to the invention.

FIG. 5 depicts example axioms for structural congruence according to the invention.

DETAILED DESCRIPTION OF ILLUSTRATIVE EMBODIMENTS

Overview

The invention provides an extension of π-calculus having a data language syntax that is a fragment of the programming language syntax. A novel, concurrent language according to the invention for XML processing may be referred to as πDuce. An object of the invention is to provide a concurrent calculus with a simple and powerful semantics.

It has been observed that XML data types and process calculi have trees as a common semantic denominator. This indicates a potential strict intertwining of the syntax and semantics of data and processes, which is missing in the functional languages described above. Actually, the unified management of data and processes, mainly manifested by a common syntax and semantics, has been the major design principle behind πDuce. For example, s[t] may denote a value, if s is a tag and t is a value, a pattern, if t is a pattern, or a process, if s is a channel. Semantics of values, patterns, and processes have been defined using the same technical devices.

In πDuce, the connection between processes and data may be emphasized by regarding processes as data. This amounts to treating processes as messages. A process may be matched with a process variable only, which may be run or passed forward. Thus, for instance, transmitted processes may be used to invoke other processes (e.g., web services), or to query databases that are local to the receiver and give back the answer.

Exemplary Computing Environment

Figure 1:
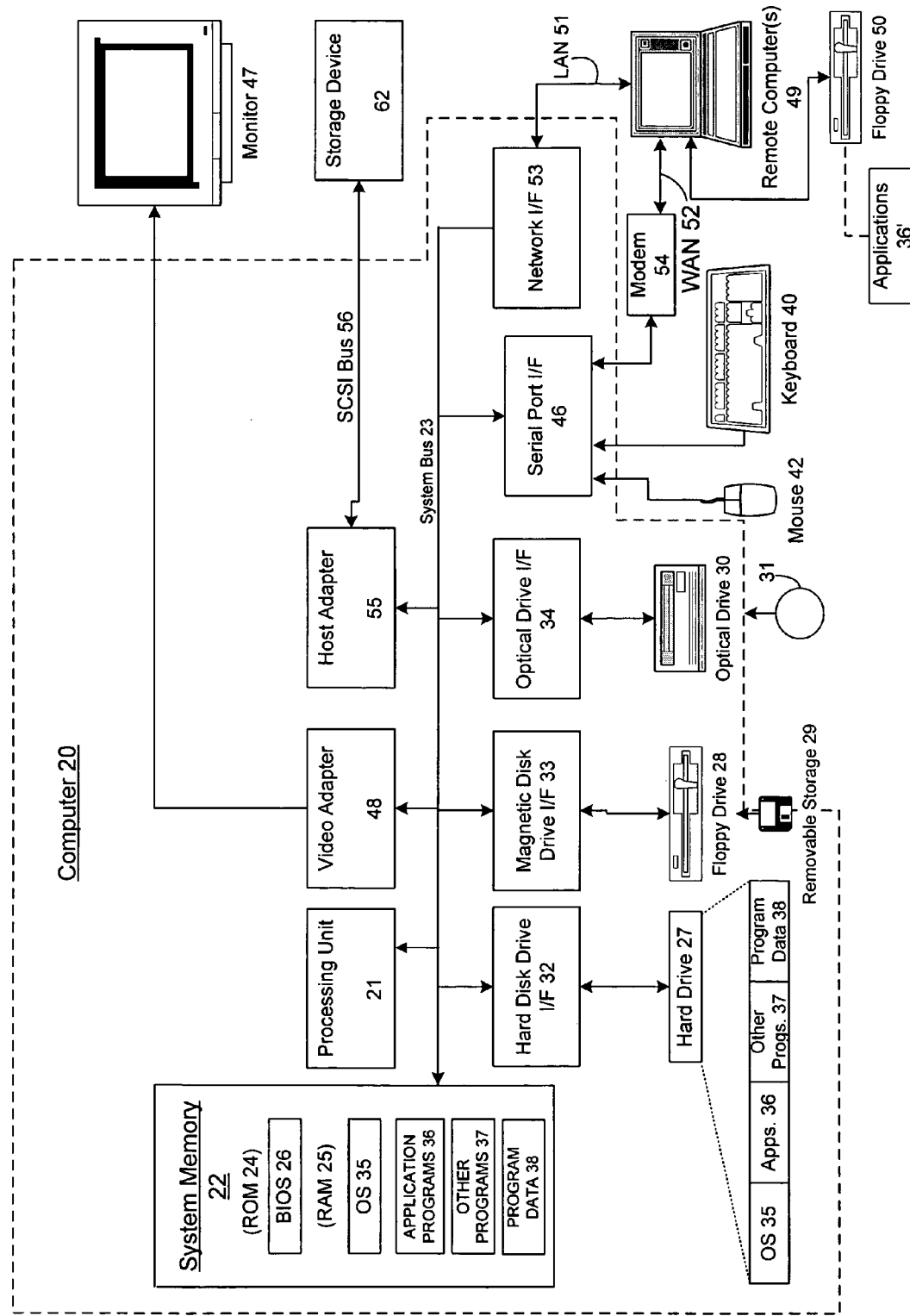
FIG. 1 is a block diagram representing a computer system in which aspects of the invention may be incorporated.

Numerous embodiments of the present invention may execute on a computer. FIG. 1 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. An "object" is a unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced.

Moreover, those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Network Environment

Figure 2:
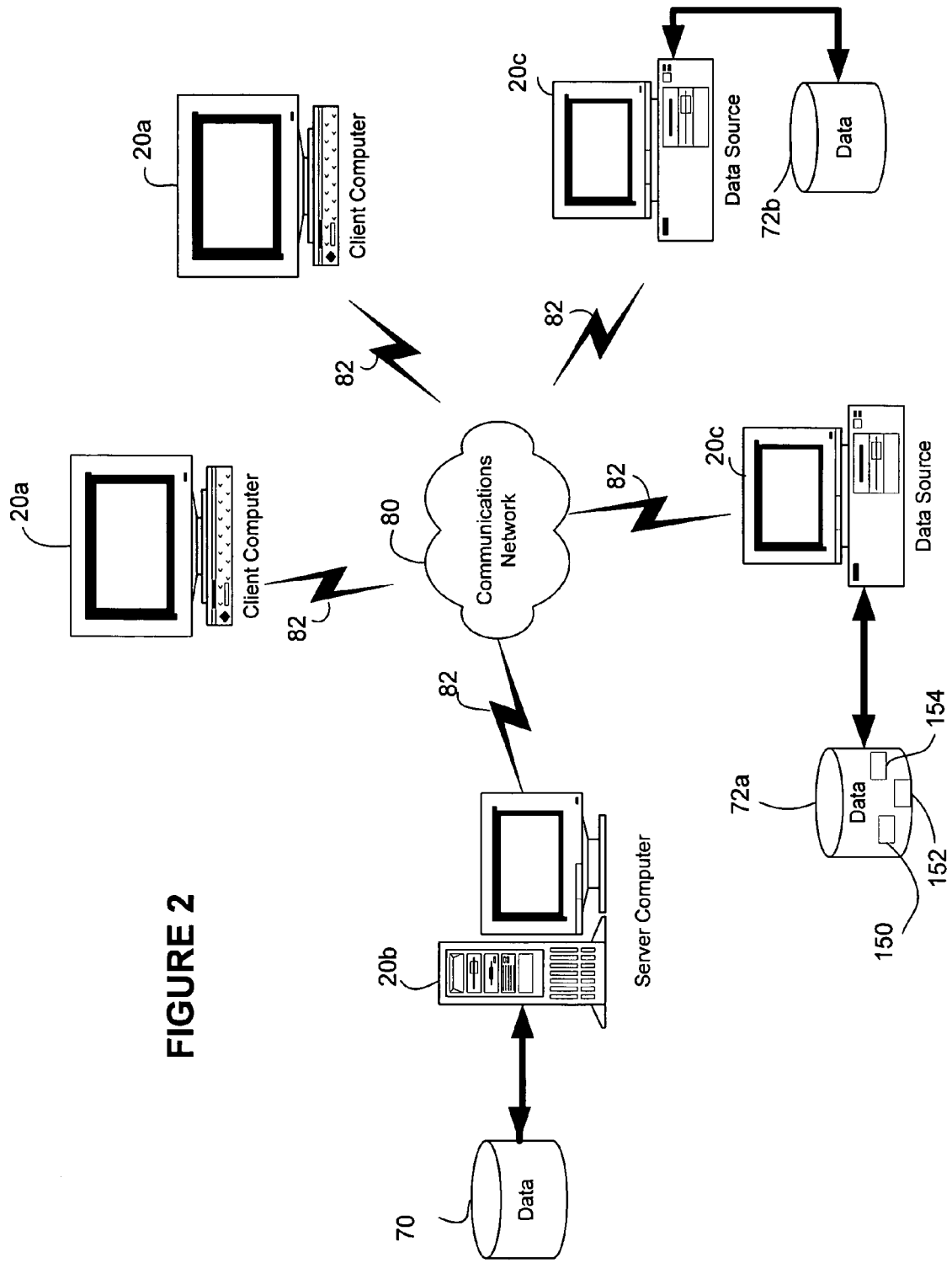
FIG. 2 is schematic diagram representing a network in which aspects of the invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention may operate. Other environments are contemplated.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

Exemplary Embodiments

A complete formal definition of an exemplary language according to the invention will now be provided, including the syntax, operational semantics, and extensional semantics.

Programming Language Syntax

Basically, the programming language syntax relies on a set of simple datatypes, having a distinguished type collecting all channel values. Simple values that are not channels may range over l, l', . . . ; channel values may range over x, y, . . . , which may be instantiated with processes. In an example embodiment, the programming language syntax may include values V, patterns T, and processes P defined by the following grammar.

As shown in FIG. 3A, syntactical elements that represent values may include simple data values, l, data variables, u, the empty value, 0, channel values, x, and tagged values, a[V].V, where the tag, a, is a tag name. Values without any data variable may be referred to as "basic" values.

As shown in FIG. 3B, syntactical elements that represent patterns may include the empty pattern, 0, tagged patterns, a[T].T', that match with values with leading tag a, parallel patterns, T|T', that match with values being interleavings of values matching with T and T', and data variables, u, that match with every value of a corresponding type. According to the syntax, channel values may not occur in patterns. Additionally, patterns may be linear with respect to data variables. That is, data variables occurring in T and T' of patterns a[T].T' and T|T' do not clash, namely, fv(T) . . . fv(T')=0. This is enforced in the definition of free variable, fv(.), provided below.

As shown in FIG. 3C, syntactical elements that represent processes may include the nil process, 0. Input processes, x(T).P, may have a syntax similar to tagged values, with channel names (or data variables) instead of tagged names, curved parentheses instead of squared ones, and continuations that are processes. Round brackets emphasize that input x(T).P is a binder with respect to data variables in pattern T. The scope of these data variables is the continuation P. Process syntactical elements may also include parallel processes, P|P, a choice between two processes, P+P, an output message, x[V], sent on a channel x that carries a value V, a new process (x)P, that is a binder for x with scope P, or a process variable, X. A syntactical element for recursion may be expressed as rec X.P.

As described herein, patterns and processes may meet the following conditions of well-formedness. These conditions may be preserved by transitions.

Parallel patterns may have at most one component that is a data variable. Tagged patterns in parallel may have pairwise different tags. This condition is entailed by the unique particle attribution conditions of both XML DTDs and XML schemas. For instance, a[u].b[v]|b[w] is ill-formed because there are two possible substitutions for v and w. On the other hand, a[u]|b[v].b[w] is well-formed.

For processes, addends of choice are input-guarded. In rec X.P, for example, the free occurrences of X in P are underneath an input prefix (guarded recursion). Therefore, P+0 is not a valid process, nor are rec X.P+X and rec X.P|X.

The following shorthand notation may be used herein: $(x_1 \ldots x_n)P$ may be used to represent $(x_1) \ldots (x_n)P, \Sigma_{i \in 1 \ldots n} P_i$ for $P_1 + \ldots + P_n$, and $\Pi_{i \in 1 \ldots n} P_i$ may be used to represent $P_1 | \ldots | P_n$, meaning that the processes $P_1 \ldots P_n$ are running concurrently (i.e., in parallel). Further, when $V \neq 0$, the notation V.V' may be used for the value that is the concatenation of V, where the tailing 0 is dropped, and V'.

In input and output, the channel x may be referred to as a "subject." Free variables, fv(·), and free channels, fc(·), may be defined. Variables and channels that are not free are called bound. Bound variables and bound channels may be noted bv(·) and bc(·), respectively. In particular, if u∈fv(P) and u∈fv (T), then the free occurrences of u in P are bound in the input x(T).P. If X∈fv(P), then the free occurrences of X in P are bound in the recursion rec X.P. If x∈fc(P), then the free occurrences of x in P are bound in the new x(P). If fv(P)=0, then P is variable-closed. If fc(P)=0, then P is channel-closed.

Operational Semantics

Usually, patterns validate the structure of some expression and select parts of it. Values sent along a channel may be decomposed by patterns appearing in object position of inputs along the same channel.

The semantics of a pattern may be defined with respect to a value: if the value matches with the pattern, then a substitution is given. The substitution is well-typed, and maps data variables to suitable values (of the same type). An exemplary algorithm, which may be referred to as "pattern-matching," is defined below. If σ and σ' are two substitutions with disjoint domains, then the notation σ+σ' may be used to address the function that is always the union of σ and σ'. Below, the union is always well-defined because patterns are linear with respect to substituted data variables.

Figure 4:
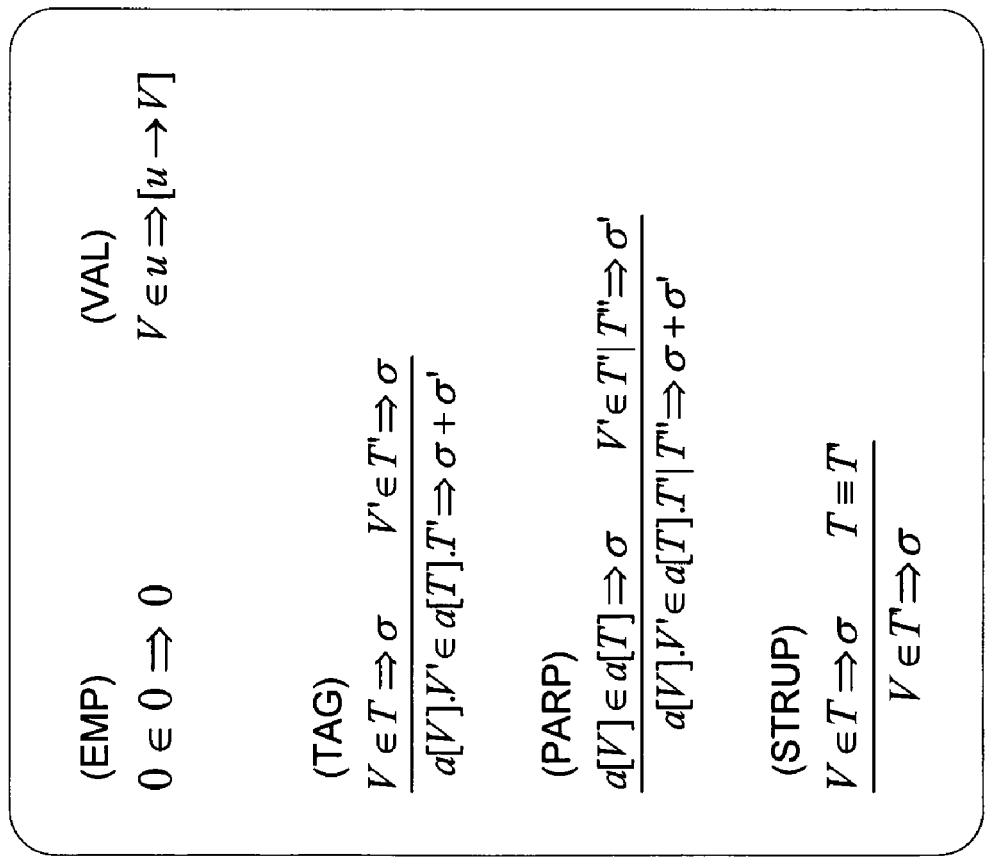
FIG. 4 depicts example rules for pattern-matching according to the invention.

The structural congruence of patterns is defined to be the least congruence satisfying the abelian monoid laws for parallel (i.e., associativity, commutativity, and identity). The pattern matching of a value V with respect to a pattern T, which may be written $V \Downarrow T \Rightarrow \sigma$, is the least relation satisfying the rules shown in FIG. 4.

The rule (VAL) defines a substitution of a data variable. This substitution may be applied to values that contain data variables.

The rule (PARP) allows matching a value with respect to a parallel pattern. This matching is deterministic by well-formedness, because patterns have at most one data variable in parallel, and there is at most one tagged pattern with a given tag. In the premise of the rule, a[V]∈a[T]=>σ, which conventionally means a[V].0∈a[T].0=>σ. According to the rules (PARP) and (STRUP), any of the values a[0].b[0].c[0], a[0].c[0].b[0], or c[0].a[0].b[0] matches with the pattern a[u].b[v]|c[w]. Further, it is observed that patterns are weaker than XML queries. In particular, queries extend patterns with a repetition operator that allows checking the regular structure of values.

Let ID be the identity substitution. Let the norm of T, $\hat{T}$, be the set $\{V | V \in T \Rightarrow ID\}$. Namely, $\hat{T}$ gives all the possible sequentializations of the pattern T. A standard alternative definition of $\hat{T}$ is to define a shuffle operator over values that give all the possible interleavings. $\hat{T}$ is finite, and if T≡T' then $\hat{T} = \hat{T}'$. A pattern T may be considered "sequential" if it does not contain any parallel pattern. Every sequential pattern is also a value. For sequential patterns T, $\hat{T} = \{T\}$.

As for patterns, the operational semantics of πDuce also uses structural congruence, which equates all agents that would never be distinguished for any semantic reason.

According to the invention, the structural congruence, ≡, between processes is the least congruence closed with respect to alpha-renaming, satisfying the abelian monoid laws for parallel (associativity, commutativity, and identity), associativity and commutativity for choice, and the axioms shown in FIG. 5.

Figure 6:
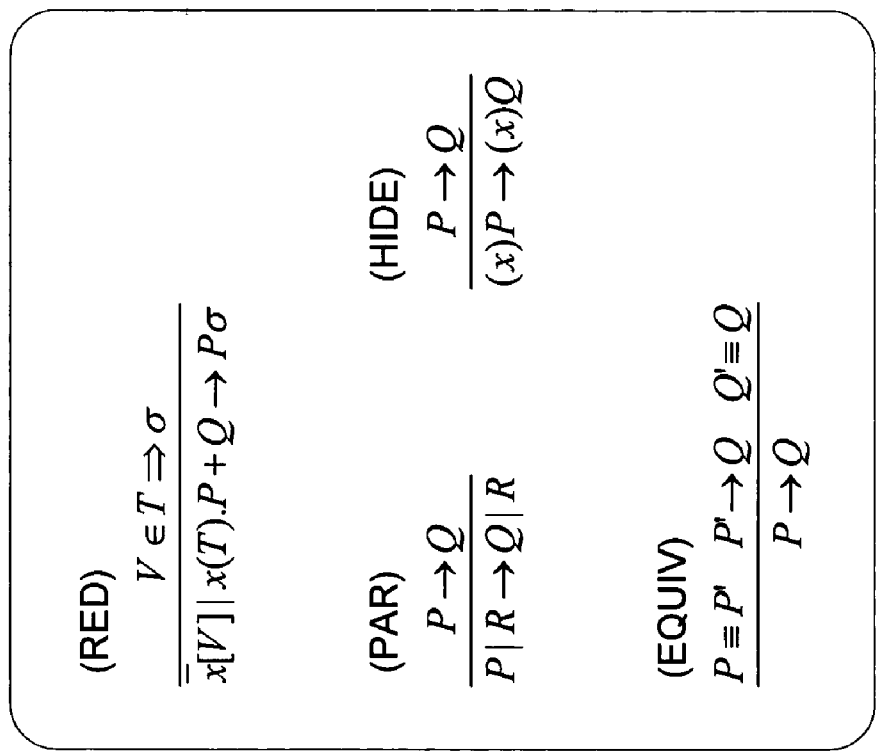
FIG. 6 depicts example rules for a reduction relation according to the invention.

A reduction relation according to the invention, which may be noted →, may be defined as the least relation satisfying the rules depicted in FIG. 6.

According to (RED), a communication between $\bar{x}[V]$ and x(T).P occurs provided V pattern-matches with T. It is observed that, if fv(P)=ø and P→Q, then the value V that matches in the reduction is such that fv(V)=ø. It is also observed that (RED) also accounts for sums that are input-guarded, by definition. For example, non-determinism is exhibited by x(u).P+x(v).Q. By contrast, the behavior of x(a [u]).P+x(b[v]).Q is deterministic because the pattern-matching will never succeed for a[u] and b[v]. The other rules account for parallel contexts, new contexts, and structural congruence in a standard way.

Barbed Congruence

The reduction relation associates processes with graphs that may be referred to as "transition systems." The reduction relation distinguishes 0 and $(x)(\bar{x}[0]|x(0))$ as a consequence of their distinct graphs. Therefore, an extensional semantics, barbed congruence, may be introduced wherein two agents are considered equivalent if their reductions match and they are indistinguishable under global observations.

Figure 7:
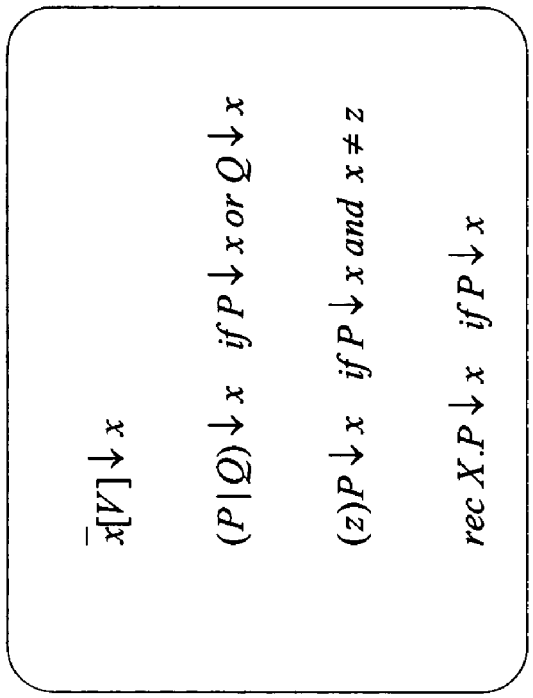
FIG. 7 depicts example rules for an observation relation according to the invention.

The observation relation is the least relation satisfying the rules depicted in FIG. 7. Note that the input process, x(T).P, has no barb. Indeed, in πDuce, as well as other asynchronous calculi, an observer has no direct way to detect whether a message he has sent has been received or not. Similarly, the choice process, P+Q, also has no barb. This is because of the well-formedness constraint that addends of summands must be input-guarded.

A barbed bisimulation is a symmetric binary relation S between agents such that P S Q implies: 1. If P→P', then Q=>Q' and P' S Q'; 2. If P⇓x, then Q∈x. P is barbed bisimilar to Q, written P≈Q, if P S Q for some barbed bisimulation S. Barbed congruence, written ≈, is the largest barbed bisimulation that is also a congruence.

It is well-known that, due to the universal quantification over contexts, barbed congruence is hard to demonstrate. A standard remedy mitigating this difficulty is the following context lemma: P≈Q if and only if Pσ|R·≈Qσ|R, for every R and substitution σ. This context lemma replaces the quantification over contexts with a quantification over parallel contexts and substitutions, which is still hard to verify. Therefore, a standard alternative semantics that is easier to apply, the asynchronous bisimulation, is provided below.

An interesting result concerns the discriminating power of πDuce with respect to patterns. That is, T≡T' if and only if, for every V∈$\hat{T}$, x(T).$\bar{x}$[V]≈x(T').$\bar{x}$[V].

Asynchronous Bisimulation

A labeled operational model for the πDuce will now be introduced and then equipped with a standard bisimulation. Thus, quantification over contexts in barbed congruence, which makes direct proofs particularly difficult, may be avoided. For technical reasons, both the operational model and labeled bisimilarity may be defined for processes with free channel variables. Herein, channels and data variables may be addressed using names x, y, z, . . . .

Let labels, ranged over by μ, ν, . . . , be denoted by τ, input x(T), output $\bar{x}$[V], and bound output $(\tilde{z})\bar{x}$[V]. Let also fc(τ)=ø, fc(x(T))={x}, fc($\bar{x}$[V])={x}∪fc(V), and fc(($\tilde{z}$) $\bar{x}$[V])=({x}∪fc(V))\$\tilde{z}$. Finally, let bc(μ) be $\tilde{z}$, if μ=($\tilde{z}$)$\bar{x}$[E], and be ø, otherwise.

Figures 8, 9:
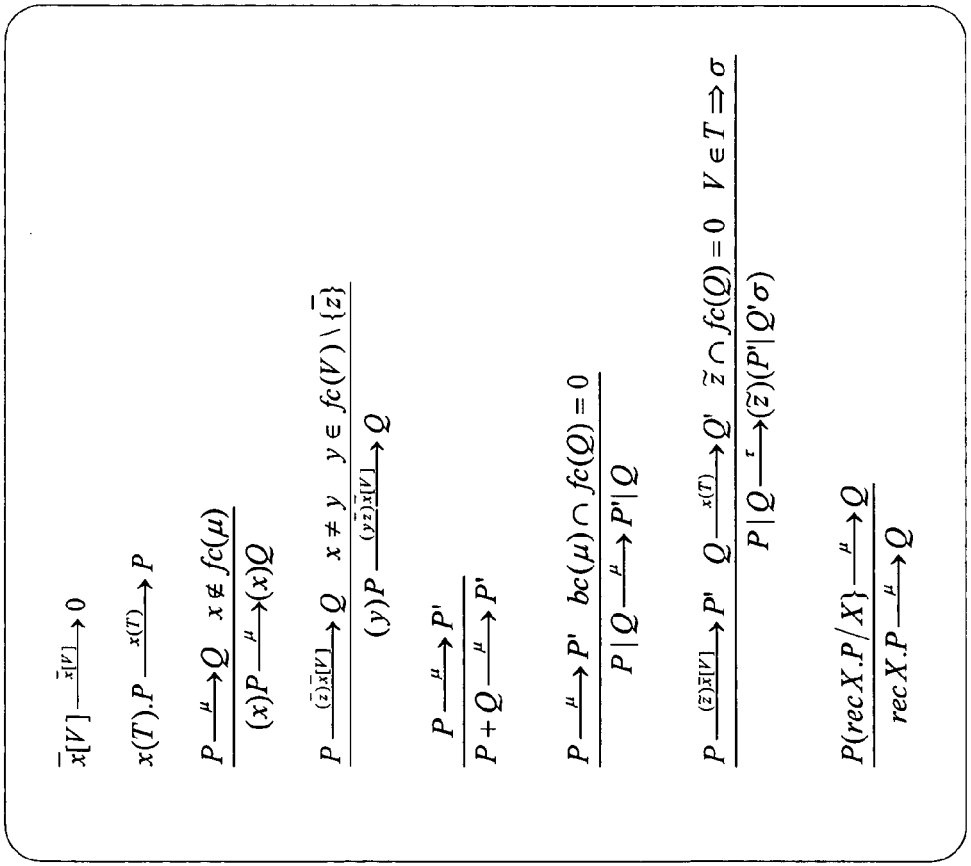
FIG. 8 depicts example rules for a transition relation according to the invention.
FIG. 9 depicts implications of asynchronous bisimulation according to the invention.

The transition relation of the πDuce, noted $$\xrightarrow{\mu},$$

is the least relation satisfying the rules depicted in FIG. 8, plus the symmetric rules for choice and parallel. Note that, if fv(P)=Ø, and $$P \xrightarrow{\mu} Q,$$

then fv(V)=Ø.

The definition of bisimulation provided in FIG. 9 is convenient from the verification point of view because it supports co-inductive reasoning without any universal quantification. An asynchronous bisimulation may be defined as a symmetric binary relation S between processes P and Q such that P S Q implies the relations depicted in FIG. 9. Further, P is asynchronous bisimilar to Q, which may be written P≈$_b$ Q, if P S Q for some asynchronous bisimulation S.

EXAMPLES

The following examples are provided for acquaintance with syntax and semantics of πDuce.

The Address Book Process

This process takes a name together with either an address or a telephone number and creates an entry in the address book:

mk[nm[u]|int[v]].$\overline{enter}$[name[u].tel[v]]
+mk[nm[u]|string[v]].$\overline{enter}$[name[u].addr[v]].

This process shows the interplay between choice and pattern matching for selecting one behavior among several. Observe that the input guards may match with sequences of values nm and int (or string) regardless of the order of the values.

The Conditional Process

The conditional process, if (V=V') then P else Q, may be encoded by delegating a service, usually a system function call, to perform the check of the boolean guard. This service may take the guard and two continuation channels, and reply on one channel or another according to whether the guard is true or false. Let if be the name of this function, and let the function call be modeled with an output message. The caller may be specified as (xy)(
$\overline{if}$[equality[val1[V].val2[V']].tt[x].ff[y]]|x(0).P|y(0).Q).

Additionally, the service for conditionals could be customized to check basic values only, such as integers or booleans, instead of generic ones, such as channels.

The Evaluator for Finite Processes

An evaluator may be defined for zeroadic π-calculus processes without a new process. The evaluator takes the syntax tree of such processes and runs them. Let T be the syntax trees defined by the following grammar:

$$T ::= 0 och[x] ich[x].cont[T] par[T].par[T] bang[T]$$

The evaluator is the following recursive process, called EVAL$_z$:

rec Eval.

$$z(0).Eval + z(och[u]) \cdot (\overline{u}[] \mid Eval) +$$
$$z(ich[u] \mid cont[v]) \cdot (u(v) \cdot z[v] \mid Eval) +$$
$$z(par[u] \mid par[v]) \cdot (z[u] \mid z[v] \mid Eval) +$$
$$z(bang[u]) \cdot (rec\ A.\ (x)(x().A \mid x[] \mid z[u]) \mid Eval)$$

With a process such as Eval$_z$, an application such as a service that evaluates a process and stores it locally to retrieve later on (for instance, to re-run it in case of failures) may be developed. Such a service, which uses a channel x to access to the store, may be defined as: (z')(Eval$_z$'|rec ev&fwd.z(u).($\overline{z}$'[u]|$\overline{x}$[u]|ev&fwd)).

Conclusions

πDuce is a process language with native XML datatypes and operators for constructing and deconstructing XML documents. It has been designed for modeling applications that are intrinsically concurrent, such as web services. A distributed implementation of πDuce may be prototyped by using the theory developed in "Linear Forwarders," for example (see P. Gardner, C. Laneve, and L. Wischik, *Linear Forwarders*, 14th International Conference on Concurrency Theory (CONCUR 2003), volume 2761 of Lecture Notes in Computer Science, pp. 415-430, Springer-Verlag, 2002). This prototype may serve as a distributed virtual machine for a high level web application language, such as BIZTALK or BPEL4WS.

The term virtual machine refers to a theoretical machine or computer that is able to directly execute an intermediate code of a computer program. Generally, no such computer actually exists, hence the term "virtual." Rather, for a real computer or machine, such as a RISC processor- or *86 processor-based computer, to execute the intermediate code, the intermediate code must be compiled into a local (also known as native, or machine) code version understandable by the machine being utilized, or the intermediate code must be interpreted by a program running on the machine being utilized.

In at least some embodiments of the invention, this entails usage of a native machine program running on a computer. The native machine program thus includes a code generator in accordance with an embodiment of the invention, which is able to generate local code from the intermediate code, so that the original virtual machine program is rendered executable. It is noted that the code generator itself may have components such as a pattern matcher, for utilization in translating the intermediate code.

The Encoding of (Nondeterministic) XDuce with Prefixing

XDuce has been recently proposed as a statically typed programming language for XML processing (Hosoya et al., *XDuce: A statically typed AML processing language*, ACM Transactions on Internet Technology (TOIT), 3(2): 117-148, 2003). Since πDuce has been explicitly designed for integrating XML and process calculi, encoding XDuce into πDuce is a valuable expressivity test for the latter.

Consider the untyped XDuce. In this setting, a program consists of a set of function names, ranged over by f, whose definition is given by a fixed, global, mutual recursive set of definitions fun f(p)=t.

The syntax of patterns p and terms t is given by the following grammar:

| | |
|---|---|
| p::= | pattern |
| T | (wildcard pattern) |
| val u as p | (variable binder) |
| () | (empty sequence) |
| a\|p\| | (tagged pattern) |
| p, p | (concatonation) |
| t::= | term |
| x | (variable) |
| () | (empty sequence) |
| a[t] | (label) |
| t, t | (concatonation) |
| match t with p1 :t$_1$; ... : p$_n$ :t$_n$ | (pattern match) |
| f(t) | (application) |

Patterns and terms are similar to those in πDuce or are standard, except for the patterns T and val u as p. The wildcard pattern T matches with every value: it is used when a part of a value is not relevant. The variable binder val u as p binds variables. In addition to the corresponding operation in πDuce, the variable binder also creates synonyms: val u as (val v as p) matches u and v to the value which matches with p.

As in πDuce, patterns are linear with respect to variables. The syntax of patterns is restricted in several ways:

1. Mutually recursive definitions have been removed. These may be of some interest as long as they define infinite patterns. However, there is no value matching with such patterns, since values are finite trees.

2. Choice patterns are omitted because, for simplicity, such patterns have been removed from πDuce (the interplay between choice, tagged values, and parallel require suitable structural laws. Adding choice patterns to πDuce and coping with choice pattern of XDuce is not difficult.

3. There is no repetition pattern. These patterns cannot have any variable in XDuce, therefore it is not possible to group any subterm inside a repetition pattern. For this reason they are not considered in the πDuce.

Terms, on the contrary, are the same of XDuce, but with the following restriction. Terms, as well as patterns, are restricted such that for p, p' or t, t', p and t must be tagged pattern and label, respectively. This language is addressed as the (nondeterministic) XDuce with prefixing.

Free variables, addressed by fv(•), bound variables, and substitutions have standard definitions. The notation fv(p, t) abbreviates fv(p)∪fv(t).

The semantics of nondeterministic XDuce is given below. The pattern matching is separated from the semantics of expressions.

The pattern matching of a value t against a pattern p and giving a substitution σ, written t∈p⇒σ, is defined inductively by the following rules. Observe that t is always a possibly nested sequence of labels.

$$()\in()\Rightarrow\emptyset \quad t\in T\Rightarrow\emptyset \quad \frac{t\in p\Rightarrow\sigma}{t\in val\,u\,as\,p\Rightarrow u:t+\sigma}$$

$$\frac{t\in p\Rightarrow\sigma}{a|t|\in a|p|\Rightarrow\sigma} \quad \frac{t\in p\Rightarrow\sigma\,t'\in p'\Rightarrow\sigma'}{t,t'\in p,p'\Rightarrow\sigma+\sigma'}$$

The sum of substitutions is well defined since, by linearity, the t∈p⇒σ is defined provided t is a value. Values, as in πDuce, are those terms built with the operators of labels, empty sequence, and concatenation. It may be decided to check whether a term is a value or not.

The evaluation of terms t→t'. Hosoya et al. define a big-step call-by-value semantics for XDuce (this simplifies the proof of subject reduction of the corresponding static semantics, which is their main concern). Here a small-step semantics is provided, which is easier to put in correspondence with the one of πDuce.

$$\frac{t\in p\Rightarrow\sigma\,\,\text{fun}\,\,f(p)=t'}{f(t)\to t'\sigma}$$

$$\frac{t-t'}{\text{match}\,\,t\,\,\text{with}\,\,\overline{p}:\overline{n}\to\text{match}\,\,t'\,\,\text{with}\,\,\overline{p}:\overline{s}}$$

$$\frac{t\in p_t\Rightarrow\sigma}{\text{match}\,\,t\,\,\text{with}\,\,p_1:t_1\ldots;p_n:t_o\to t_1\sigma}$$

$$\frac{t\to t'}{a|t|\to a|t'|} \quad \frac{t\to t'}{t,n\to t',n} \quad \frac{t\to t'}{s,t\to s,t'} \quad \frac{t\to t'}{f(t)\to f(t')}$$

The application f(t) and the match t with p̃:s̃ are evaluated provided t is a term built by the operators of empty sequence, label, and concatenation. These terms are basic values (in XDuce they are called "values"). Basic values t, which are the same both in XDuce and in πDuce, have the property that there is no t' such that t→t'. Henceforth the second and third rules of the reduction relation are exclusive.

The semantics of the pattern match operator is different than in XDuce. The latter has a "first match" semantics, namely the sequel of patterns p1:t1, ..., pn:tn is evaluated in order, and the first pattern that succeeds is chosen. In order to encode this in πDuce, one has to consider a continuation passing style, with two types of continuations: successful and unsuccessful, and a pattern is evaluated if all the preceding ones were unsuccessful. Such a continuation passing style would have made unintelligible the translation. For this reason, consider a semantics that is easier to implement—the "nondeterministic match"—where the pattern is chosen nondeterministically. Yet, the encoding of sequencing may be given in a standard way by means of an explicit continuation passing style.

The Encoding

The encoding consists of three functions [[p]]$_ũ$, [[fun f(p)=t]], and [[t]]$_z$, where p and t are patterns and terms in XDuce, z is a channel value or a channel variable, and ũ is a tuple of variables in πDuce. The first and second encodings give a process in πDuce. The third one gives a pair, where the first component is a possibly nested sequence of πDuce patterns, noted by ρ, and the second component is a tuple of πDuce variables. More precisely, ρ may be 0, or a variable u, or a tagged value a[ρ'].ρ", or a variable prefixing u;ρ'.

The function ⌈p⌉$_n$. This mapping is defined inductively as follows. (∈ represents the emply list.)

$$\|T\|_a = v, \overline{u}v \qquad v \notin \overline{u}$$
$$\|0\|_a = 0, \overline{u} \qquad \square$$
$$\|val\,v\,as\,p\|_a = v; \rho, \overline{w}v \quad \text{where}\,\,\|p\|_{\overline{u}v} = \rho, \overline{w}$$
$$[a \mid p]_a = a|\rho|, \overline{u} \quad \text{where}\,\,[p]_a = \rho, \overline{v}$$
$$[a|p|, p']_a = a|\rho|\cdot\rho', \overline{w} \quad \text{where}\,\,[p]_a = \rho, \overline{v}\,\,\text{and}$$
$$[p']_a = p', \overline{w}$$

The encoding of T has required a bit of gymnastic because it misses in πDuce. To encode T, a fresh variable is used, since variables match with every value and, being fresh, it is discarded after the matching. For this reason $[[p]]_{\tilde{u}}$ takes a tuple ũ of variables that are "in use", which is initially set to the free variables of the pattern and its scope. $[[p]]_{\tilde{u}}$ gives the tuple of variables that have been used and cannot be used elsewhere. This last constraint is manifested by $[[p, p']]_{\tilde{u}}$, where the encoding of p' is also indexed with the variables introduced by the encoding of p.

The variable binder also shows a problematic encoding. The intended semantics of the variable binder is to evaluate p, and then, in case of success, to bind the value to the variable. This sequentiality is expressed by the first item of $[[\text{val } x \text{ as } p]]_{\tilde{u}}$, which is indeed a sequence (that will be interpreted in the reverse order by p2p( )).

In the concatenation pattern the constraint on XDuce is made explicit with prefixing. Namely, in p, p', p must be equal to a[p''], for some a and p''. The encoding has been defined as a consequence of this constraint.

The functions $[[\text{fun } f(p)=t]]$ and $[[t]]_z$. An auxiliary function p2p(•, •, •) is used to render the sequences of pattern matchings ρ into πDuce processes. The arguments of p2p(•, •, •) are a matching basic value t, a sequence ρ, and a continuation process P. p2p(t, ρ, P) is defined as follows:

(x)($\bar{x}$|t||x(u).P), if ρ=u;
(x)(P2P(t, ρ',$\bar{x}$|t|)|x(u).P), if ρ=u; ρ';
(x)($\bar{x}$|t||x(α[u]).P2P(u, ρ', P) if ρ=α[ρ']
(x)($\bar{x}$|t||x(α|u|.u).P2P(u, ρ',P2P(u, ρ'', P))), if ρ=a.|ρ'|.ρ''.

The cases when ρ is u;ρ' or a[ρ'].ρ'' are described. In the former case, a value t is first matched with ρ'; only if this match succeeds, the variable u is instantiated with t. When ρ is a[ρ']. ρ'', the value t is first matched with a[u].v. In case t is equal to a[t'].t'' then t' is matched against ρ', and t'' is matched against ρ'' in sequence.

Every preliminary is in place to define the encoding of terms. Let cont be a distinguished tag that is not used in XDuce. This tag is used to label continuations in function calls. Then $[[\text{fun } f(p)=t]]$ and $[[t]]_z$ are defined as follows:

$$[\![\text{fun } f(p) = t]\!] = rec\ F.f(cont|u|.v) \cdot (p2p(v, p_1[t]_u) \mid F)$$

where $[p]_{fv(p,t)} = \rho, \bar{w}.$ $$[u]_z = \bar{z}|u|$$

$$[a|l|]_z = (v)(v(u).\bar{z}|a|u\| \mid [\![t]\!]_v)f$$

$$[0]_z = z|0|$$

$$\|a|t|, t'\|_z = (x, y)(x(u), y(u)z|a|$$

$$\|[t]_z|[t']_y)$$

$$\|\text{match } t \text{ with } (p_i:t_i)^{i=1...n}\|_z = x)(x(u) \cdot \sum_{i\in 1...u} P2P(u, \rho_i, [t_i]_z)$$
$$\quad |[t]_x\rangle \text{ where } [pz]_{(v(p_i:t_i)=p_i,\bar{v}_i}$$

$$[f(t)]_z = (x)([t]_z \mid x(u).?|cont|z|.u\,|)$$

$(p_1 : t_1; \ldots; p_n : t_n$ has been shortened into $(p_2 : t_i)^{u,1...n})$.

Since this encoding is not particularly difficult, it is illustrated by an example. Consider the XDuce function append that takes two lists and concatenates them. Below, a pair (u, v) is encoded by pair[u], v, while a list is encoded as a sequence of values tagged e1, except the last one that is ( ).

fun append(pair[u], v) = match u with ( ) : v e1[w],
w' : e1|w|, append(pair|w'|, v)

This function is encoded as follows (with few optimizations):

rec F. append(cont[u].v).(F|P_{uv})

$F_{uv}=(x)(\bar{x}|u\|x(\text{pair}|u'|.v').Q_{uv'v'})$ $Q_{uu'u'}=(y)(\bar{y}|u'\|(y(0).\bar{u}|v'|+y(e1|w|.w').R_{uu'}^{ww'}))$ $R_{uu'}^{ww'}=(z)(\overline{\text{append}}|\text{cont}|z|.(e1|w'|.v')\|z(w'').$
$\bar{u}|e1[w].w''|)$ The foregoing encoding is correct as affirmed by the lemma:

LEMMA 12. Let fun $f_i(p_i)=t_i$, i∈1 . . . n, be the set if global functions and t be the term to evaluate. If t⇒t' and t' is a value, then $\Pi_{t\in 1 \ldots n}\|\text{fun } f_i(p_1)=t_i\|[t]_{ti} \Rightarrow \Pi_{t\in 1 \ldots n}\|\text{fun } f_t(p_t)=t_t\|\bar{u}|t'\{\%\}|$.

This lemma guarantees that no garbage is created by the encoding. Yet the lemma is not strong enough, since it does not give any guarantee about misbehaviors of the encoded process. Indeed this is the case, in particular for the encoding of the match. It is possible that a wrong alternative is chosen and the process struggles over a match that fails. To overcome this issue, failures in (internal) matchings may be considered and then suitable continuations added.

Higher Order

Transmitting processes during communications is considered a convenient feature for web applications. In this section, the extension of ρDuce is described where messages may also carry processes, called higher order πDuce. In facts, a sort of second order π-calculus is presented. The definition of barbed congruence for the higher order πDuce is the same as set forth above. Therefore, in this section labelled bisimulation is focussed upon, which has a different definition. The technical details are mostly drawn from Sangiori, *Bisimulation with higher-order process calculi*, Information and Computation, 131: 141-178, 1996, with minor adjustments regarding asynchronicity.

The syntax of higher order πDuce contains a new category, the category of agents B. Values, patterns, and processes are those set forth above plus the following extensions:

|   |   |   | value |
|---|---|---|---|
| V ::= | X |   | (agent variable) |
|   | (T)P |   | (abstraction) |
|   |   |   | pattern |
| T ::= | X |   | (agent variable) |
|   |   |   | process |
| P ::= | X · (E) |   | (application) |
|   | P |   | agent |
| B ::= | (T)P |   | (process) |
|   | (E)(V)P |   | (abstraction) |
|   |   |   | (concretion) |

Note that patterns are enriched with agent variables, that may be only instantiated by agents, actually abstractions. The abstraction agent (T)P has a notation similar to the new process (x)P. However there is no space for ambiguities, since in abstractions (T)P the pattern T may contain channel variables, whilst in new (x)P must have x being a channel value. The application process is restricted to agent variables. The general case is considered syntactic sugar as now defined. Let A and C range over abstractions and concretions, respectively. Let also (T)P|Q denote (T)(P|Q), when fv(T)∩fv(Q)=θ

(x)(T)P denote (T)(x)P (($\bar{z}$)(V)P|Q denote ($\bar{z}$)(V)(P|Q), when $\bar{z}$∩fc(Q)=θ

(x)($\bar{z}$)(V)P denote (x$\bar{z}$)(V)P

Similar denotations are defined for P|A and P|C. Finally, let $\bar{z}$∩fc(P)=0 and V∈T⇒σ ((pattern matching is as before, with pattern variables that may be instantiated by processes, too). Then consider the following definitions:

$$(T)P \cdot (z)(V)Q \stackrel{def}{=} (z)(P\sigma \mid Q)$$

$$(z)(V)Q \cdot (T)P \stackrel{def}{=} (z)(Q \mid P\sigma)$$

The transition relation of the higher order πDuce is defined over agents. Recall that x ranges over channels and channel variables. Labels, ranged over by α, . . . , be T, input x, and output $\bar{x}$.

DEFINITION 13. The transition relation of the highter order πDuce, noted $\stackrel{a}{\to}$, is the There is no rule for X·<V>. Indeed, this process, when X is replaced by an abstraction, is rewritten according to the denotations given above, by considering <V> as the abstraction <V>0.

The labeled semantics for higher order πDuce is the so-called context bisimulation.

DEFINITION 14. A context bisimulation is a symmetric binary relation S between processes such that PSQ implies:

1. if $P \stackrel{T}{\to} P'$, then $Q \stackrel{T}{\Longrightarrow} Q'$ and $P'SQ'$;

2. if $P \stackrel{\bar{x}}{\to} C$, then $Q \stackrel{\bar{x}}{\Longrightarrow} C'$, and $C \cdot A S C' \cdot A$, for all abstractions A:

3. If $P \stackrel{x}{\to} A$, where $A = (T)P'$, then (a) either $Q \stackrel{\bar{x}}{\Longrightarrow} A'$, and $A \cdot CSA' \cdot C$, for all concrations C;

(b) or T is sequential, $Q \stackrel{T}{\Longrightarrow} Q'$, and $P'S(Q'|\bar{x} \mid T|)$.

P is context bisimilar to Q, written $P \approx_{cb} Q$, if PSQ for some context bisimulation S.

The drawback of context bisimulation is the quantification on the input clause, which makes this notion hard to be used in practice. However, Sangiorgi has provided an alternative definition, called normal bisimulation, that avoids the context quantification above. As for the first order case, context bisimulation is finer than barbed congruence, and therefore, in proofs, may be safely used instead of the latter one.

A paradigmatic setting where migration of agents is desired is when a remote service is repeatedly invoked. In this case one may consider convenient to download the remote service and invoke it locally. A service that supports the download feature is the following:

$$WS_A \stackrel{def}{=} \text{service}(\text{arg}|u||\text{cont}|v|) \cdot A * \langle \text{arg}|u| \cdot \text{cont}|v| \rangle +$$

$$\text{download}(\text{cont}[v] \cdot \bar{v}|\text{webserv}[A]|$$

A client that wants a local copy of the service has to perform the following steps:

(z)($\overline{\text{download}}$|cont|z||.z(webserv|X|) . . . .

By means of context bisimulation, it is possible to demonstrate that invoking the remote service is the same as downloading it and running it locally. Namely the processes (service, download)($WS_A$ $|\overline{\text{service}}$[arg[e].cont[x]|)

and (service, download)($WS_A$

| (z)($\overline{\text{download}}$[cont[z|]z(webserv|X|) · (X •<arg|e|.cont[x]>)
)

are context bisimilar.

Dynamic XDuce

XDuce expressions give static XML documents. These contrast with a new class of documents that is proliferating, the so-called dynamic XML documents. These are documents where some data are explicit and others are invocations to applications, that must be called to visualize the data. The static analysis for the validity of dynamic XML documents is also a relevant issue to guarantee a standard rendering of them. Refer to Abiteboul et al., *Active XML: Peer-to-peer data and Web services integration*, VLDP 2002: Proceedings of the Twenty-Eighth International Conference on Very Large Data Bases, Hong Kong SAR, China, pages 1087-1090, Morgan Kaufmann Publishers, 2002, and Christensen et al., *Static analysis for dynamic AML*, Technical Report RS-02-24, BRICS, May 2002, for further details. In this section, XDuce is extended with features supporting the dynamic constructions of web pages. The focus is on the language extension and the encoding in πDuce, rather than typechecking issues.

The extension of XDuce concerns syntax, pattern matching, and the evaluation of terms. For syntax, it is extended with a new syntactic category of codes c as follows:

p::=as set forth above with respect to the encoding of nondeterministic XDuce with prefixing

| | |
|---|---|
| t::= | term |
| u | (simple variable) |
| () | (empty sequence) |
| a[t] | (label) |
| [e] | (code) |
| t, t | (concatonation) |
| match t with $p_1$ :$t_1$; . . . ; $p_n$ :$t_n$ | (pattern match) |
| e(t) | (application) |
| e::= | code |
| u | (code variable) |
| f | (global function) |
| fun (p) = t | (function) | where the global functions f are defined as set forth above. Terms are constrained by the closure property for codes, namely $\lceil c \rceil$ is such that $fv(c)=\emptyset$. This constraint simplifies the semantics because it avoids free variable captures when codes are transmitted. Observe that $\lceil\lceil c\rceil\rceil$ is ill-formed. Codes $\lceil c \rceil$ are values, henceforth the set of values is extended correspondingly. Variables have been generically addressed by u. However, they are partitioned into those that are instantiated by codes and those that may be replaced by values that are not codes. The formers and the latters are called code variables and simple variables.

For pattern matching, replace the rule $$\frac{t \in p \Rightarrow \sigma}{t \in \text{val } u \text{ as } p \Rightarrow u : t + \sigma}$$

with the following two:

$$\frac{t \in p \Rightarrow \sigma \ \ t \neq \lceil s \rceil}{t \in \text{val } u \text{ as } p \Rightarrow u : t + \sigma} \qquad \frac{\lceil t \rceil \in p \Rightarrow \sigma}{\lceil t \rceil \in \text{val } u \text{ as } p \Rightarrow u : t + \sigma}$$

Note that pattern matching extracts the function from the code and assign it to the variable. Assume that the substitution σ given by the pattern matching t∈p⇒σ is well typed with respect to the partition of variables.

For the evaluation relation, the rule $$\frac{t - t'}{f(t) - f(t')}$$

is replaced by the following two:

$$\frac{t - t'}{e(t) - e(t')} \qquad \frac{t \in p \Rightarrow \sigma}{\text{fun}(p) = t' - t'\sigma}$$

As an example of dynamic XDuce, consider the term
e|"the hour is"|, fc|⌈clock⌉|

This document, when downloaded, may visualize the string "the hour is 9.14 AM" on the client machine, where the "9.14 AM" part is the result of the invocation of the client clock function.

Concluding with the issue of encoding dynamic XDuce in higher order πDuce, the definition of $[[p]]_{\bar{u}}$ is the same as set forth above. The encoding of dynamic XDuce into higher order πDuce is defined by the map ◁·▷

For global functions and codes:

$$\langle|\text{fun} f(p) = t\rangle| = \text{rec} F \cdot f(\text{cont}[u] \cdot v) \cdot (p2p(u, \rho, \langle|t|\rangle \cdot \langle u \rangle)) \mid F \rangle$$
$$\text{where } |p|_{fv(p,t)} = \rho, \bar{\omega}$$
$$\langle|u|\rangle = u$$
$$\langle|f|\rangle = (u)\overline{f}|u|$$
$$\langle|\text{fun}(p) = t|\rangle = (\text{cont}|u| \cdot v) p2p(v, \rho, \langle|t|\rangle \cdot \langle u \rangle)$$

for terms (we shorten $p_1 : t_1; \ldots ; p_n : t_n$ into $(p_n : t_n)^{t \in 1 \ldots n}$):

$$\langle|v|\rangle = (u)\bar{u}|v|$$
$$\langle|a[t]|\rangle = (u)(v)(v(X) \cdot \overline{U}[a[X]] \ |\langle|t|\rangle \cdot \langle v\rangle)$$
$$\langle|()|\rangle = (u)\bar{u}|\text{nil}| \ [0]|$$
$$\langle|\lceil e\rceil|\rangle = (u)\bar{u}|\langle|e|\rangle|$$
$$\langle|a|t|, t'|\rangle = (u)(x, y)(x(v) \cdot y(\omega) \cdot \bar{u}[a|v| \cdot \omega]$$
$$|\langle|t|\rangle \cdot (x)|\langle|t'|\rangle \cdot \langle y\rangle)$$
$$(u)(x)(\langle|t|\rangle \cdot (x) \mid$$
$$\{\text{match } t \text{ with } \atop (p_1 : t_1)^{t \in 1 \ldots n}|\rangle} = x(v) \cdot \sum_{t \in 1 \ldots n} p2p(x, \rho_1, \langle|t_t|\rangle \cdot \langle u\rangle))$$
$$\text{where } \|p_1\|_{fv(p_1, t_1)} = \rho_1, \tilde{\omega}_1$$
$$\langle|e(t)|\rangle = (u)(x)(\langle|t|\rangle \cdot \langle x\rangle \mid x(v) \cdot \langle|e|\rangle \cdot \langle\text{cont}[u] \cdot v\rangle)$$

For example, let us analyze $\langle|e|"the hour is"|, fc|\lceil\text{clock}\rceil|\rangle$.

By definition, the abstraction A is obtained:

$$(u)(x, y)(\ x(v) \cdot y(w) \cdot \bar{u}|e| \ \lfloor v \uparrow \cdot w|$$
$$| \ (\text{"the hour is "}) \bullet (x) \ |$$
$$(fc|\lceil\text{clock}\rceil|) \bullet \{y\}$$
$$)$$

Therefore, evaluate the two processes:
(|"the hour is"|)·(x) and (|fc(⌈clock⌉)|)·(y)
They respectively give the two processes:
$\bar{x}$|"the hour is"| and $\bar{y}$|fc|(u)$\overline{\text{clock}}$|u|)| that substituted in the abstraction A, and performing the reductions, gives:
(u)$\bar{u}$|e1|"the hour is".fc|(u)$\overline{\text{clock}}$|u|)|

A correctness statement, similar to the first order case, may be established for the encoding (|•|). To this aim, a term t in dynamic XDuce is a value if it is built with the operations of empty sequence, label, concatenation, and code. Given a value t, let $\bar{t}$ be the term t where every code $\lceil c \rceil$ is replaced by (|c|).

LEMMA 15. Let fun $f_i(p_i)=t_i$, i∈1 ... n, be the set of global functions and t be the term to evaluate. If t⇒t' and t' is a value, then $\Pi_{t \in 1 \ldots n}$(|fun $f_i(p_i)=t_i$|)(|t|)·(u)⇒ $\Pi_{t \in 1 \ldots n}$ {|fun $f_i(p_i)=t_i$|} |$\bar{u}|\bar{t}'\{\%\}|$.

Thus, there have been described example embodiments of a process calculus having a data language syntax that is a fragment of the programming language syntax. It will be appreciated that modifications may be made to the disclosed embodiments without departing from the spirit of the invention. For example, it is contemplated that πDuce may be extended with features that allow for parsing the structure of migrating processes. If tags of tagged patterns are extended with channels, πDuce may discriminate some input-output capability (on free channels) of migrating agents. This feature may be useful for run time checks of incoming processes, for instance. The scope of the invention, therefore, is defined by the following claims.

What is claimed:

1. A computer, comprising:
a data store having stored therein computer-executable instructions expressed in a concurrent programming language having a programming language syntax and programming language semantics, wherein;
the programming language syntax and programming language semantics are based on a data language having a data language syntax and a data language semantics,
at least a portion the data language is a fragment of the concurrent programming language;
said concurrent programming language includes process syntactical elements that represent at least one process selected from a group consisting of an inactive process, an input process, a parallel process, a choice of processes, an output process, and a new process;
said concurrent programming language includes pattern syntactical elements that represent at least one pattern selected from a group consisting of an empty pattern, a tagged pattern, a parallel pattern, and a data variable; and
said concurrent programming language includes value syntactical elements that represent at least one value selected from a group consisting of an empty value, a simple value, a channel value, a data variable, and a tagged value.

2. The computer of claim 1, wherein the data language syntax is a fragment of the concurrent programming language.

3. The computer of claim 2, wherein the data language syntax is a fragment of the programming language syntax.

4. The computer of claim 1, wherein the data language syntax and semantics are intertwined with the programming language syntax and semantics.

5. The computer of claim 1, wherein data can be fragmented when run in parallel programs.

6. The computer of claim 1, wherein the concurrent programming language is an extension of pi-calculus.

7. The computer of claim 1, wherein the concurrent programming language can be modeled by a process calculus.

8. The computer of claim 7, wherein the process calculus comprises pi-calculus.

9. The computer of claim 1, wherein the data language is an extension of extensible markup language.

10. The computer of claim 1, wherein the concurrent programming language comprises a message passing instruction.

11. The computer of claim 10, wherein the message passing instruction comprises one of empty, send, receive, fresh name, run a program in parallel, and recursion.

12. The computer of claim 10, wherein the instruction comprises send, and the message comprises one of null, atom, collection, and element.

13. The computer of claim 12, wherein the atom comprises one of a literal, a channel, and a variable.

14. The computer of claim 12, wherein the collection comprises one an unordered collection and an ordered collection.

15. The computer of claim 1, wherein the concurrent programming language comprises a program constructor and a data constructor based on the program constructor.

16. The computer of claim 15, wherein the program constructor corresponds to at least one input, and the data constructor refers to a message passing output.

17. A computer, comprising:
a data store having stored therein computer-executable instructions based on a concurrent programming language having a data language syntax and a programming language syntax, wherein:
said data language syntax is a fragment of said programming language syntax;
said concurrent programming language includes process syntactical elements that represent at least one process selected from a group consisting of an inactive process, an input process, a parallel process, a choice of processes, an output process, and a new process;
said concurrent programming language includes pattern syntactical elements that represent at least one pattern selected from a group consisting of an empty pattern, a tagged pattern, a parallel pattern, and a data variable; and
said concurrent programming language includes value syntactical elements that represent at least one value selected from a group consisting of an empty value, a simple value, a channel value, a data variable, and or a tagged value.

18. The computer of claim 1, wherein the concurrent programming language is an intermediate programming language.

19. The computer of claim 1, further comprising a virtual machine for executing the instructions.

20. A virtual machine, stored in a computer-readable storage medium, for executing programming instructions based on a process calculus for structured messages, said process calculus comprising:
a data language having a data language syntax; and
a concurrent programming language having a programming language syntax, wherein:
the data language syntax is a fragment of the programming language syntax;
said concurrent programming language includes process syntactical elements that represent at least one process selected from a group consisting of an inactive process, an input process, a parallel process, a choice of processes, an output process, and a new process;
said concurrent programming language includes pattern syntactical elements that represent at least one pattern selected from a group consisting of an empty pattern, a tagged pattern, a parallel pattern, and a data variable;
said concurrent programming language includes value syntactical elements that represent at least one value selected from a group consisting of an empty value, a simple value, a channel value, a data variable, and or a tagged value.

21. A computer-readable storage medium, comprising:
a data store having stored therein computer-executable instructions expressed in a concurrent programming language having a programming language syntax and programming language semantics, wherein:
the programming language syntax and programming language semantics are based on a data language having a data language syntax and a data language semantics,
at least a portion the data language is a fragment of the concurrent programming language;
said concurrent programming language includes process syntactical elements that represent at least one process selected from a group consisting of an inactive process, an input process, a parallel process, a choice of processes, an output process, and a new process;

said concurrent programming language includes pattern syntactical elements that represent at least one pattern selected from a group consisting of an empty pattern, a tagged pattern, a parallel pattern, and a data variable; and said concurrent programming language includes value syntactical elements that represent at least one value selected from a group consisting of an empty value, a simple value, a channel value, a data variable, and a tagged value.

* * * * *